(No Model.)
W. H. COWDERY.
Rake.
No. 241,789.  Patented May 24, 1881.
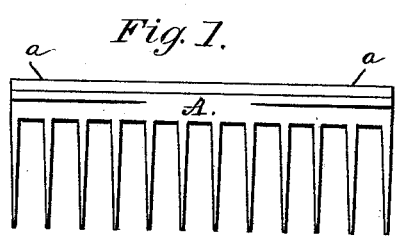
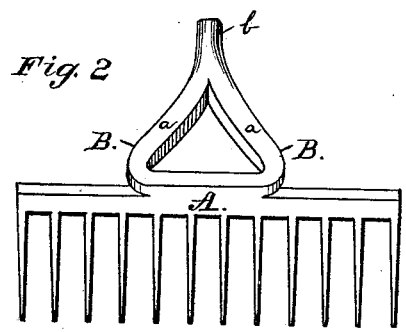
WITNESSES
W. C. Donnelly
Albert E. Lynch
INVENTOR
Warren H. Cowdery.
By Leggett & Leggett.
ATTORNEY

UNITED STATES PATENT OFFICE.

WARREN H. COWDERY, OF ASHTABULA, OHIO.

RAKE.

SPECIFICATION forming part of Letters Patent No. 241,789, dated May 24, 1881.

Application filed March 3, 1881. (No model.)

*To all whom it may concern:*

Be it known that I, WARREN H. COWDERY, of Ashtabula, in the county of Ashtabula and State of Ohio, have invented certain new and useful Improvements in Rakes; and I do hereby declare the following to be a full, clear, and exact description of the invention, such as will enable others skilled in the art to which it pertains to make and use it, reference being had to the accompanying drawings, which form part of this specification.

My invention relates to rakes, and more particularly to that class known as "garden-rakes," wherein the rake-head, teeth, and shank are made of iron or steel; and it consists in a novel construction of rake, as will hereinafter be described, and pointed out in the claim.

In the drawings, Figure 1 is a front elevation of a rake head and teeth, showing the method of forming the shank—viz., by shearing the said head part of its length, say one-third, more or less, from each end, the said sheared ends forming the shank when bent around. Fig. 2 is a view of a rake, the shank of which is formed by bending the sheared ends around, as shown, and said ends being welded together to form the tang.

A is a rake-head. B B are the braces, which also form the shank of said head A. *a a* are the sheared ends, Figs. 1 and 2, which, when turned as shown in Fig. 2, form the braces B B and its tang. *b* is the tang. C is the handle of my rake.

The method of forming the shank and braces B B is as follows: The rake-head, after the teeth are drawn out, is heated and sheared or cut about one-third of its length from each end, as shown in Fig. 1, and these ends *a a* are bent round, as shown in Fig. 2, and welded together to form the tang.

What I claim is—

A rake having its head sheared longitudinally from its opposite ends and the sheared portions bent around and welded together, forming the rake-head, braces, and tang of a single piece of metal, as described.

In testimony whereof I have signed my name to this specification in the presence of two subscribing witnesses.

WARREN H. COWDERY.

Witnesses:
ALBERT E. LYNCH,
ERNEST O. ORSBURN.